United States Patent
Benesi et al.

(10) Patent No.: US 7,815,808 B2
(45) Date of Patent: Oct. 19, 2010

(54) HOT-GAS PRESSURE-FILTER APPARATUS

(75) Inventors: Steve C. Benesi, Novato, CA (US); Patrick J. Costelloe, Walnut Creek, CA (US)

(73) Assignee: FLSmidth A/S, Valby (DK)

( * ) Notice: Subject to any disclaimer, the term of this patent is extended or adjusted under 35 U.S.C. 154(b) by 1298 days.

(21) Appl. No.: 10/501,208

(22) PCT Filed: Jan. 21, 2003

(86) PCT No.: PCT/US03/01746

§ 371 (c)(1), (2), (4) Date: May 19, 2005

(87) PCT Pub. No.: WO03/061801

PCT Pub. Date: Jul. 31, 2003

(65) Prior Publication Data

US 2006/0027509 A1    Feb. 9, 2006

Related U.S. Application Data

(60) Provisional application No. 60/350,605, filed on Jan. 22, 2002.

(51) Int. Cl.
*B01D 37/00* (2006.01)
(52) U.S. Cl. .......................... 210/741; 100/45; 100/48; 100/71; 100/73; 100/110; 100/116; 210/742; 210/771; 210/772; 210/774; 210/780

(58) Field of Classification Search .................. 34/402, 34/419, 422–424, 426, 443–446, 493, 516, 34/517; 100/45, 48, 71–74, 99, 104, 110–112, 100/116, 118, 120, 126, 193–199; 210/85, 210/87, 90, 96.1, 96.2, 103, 134, 141, 143, 210/149, 177, 180, 182, 184, 186, 194, 198.1, 210/205, 209, 210, 212, 216, 359, 387, 391, 210/398, 399, 407–410, 702, 739, 741, 742, 210/769–774, 780, 805, 806, 808, 225–227, 210/230, 231
See application file for complete search history.

(56) References Cited

U.S. PATENT DOCUMENTS 4,358,383 A    11/1982    Asp (Continued)

FOREIGN PATENT DOCUMENTS

DE    32 22 235 A 1    12/1982

(Continued)

*Primary Examiner*—Joseph W Drodge
(74) *Attorney, Agent, or Firm*—Aaron M. Pile; Daniel DeJoseph; George W. Wasson (57) ABSTRACT

A pressure-filter is disclosed along with its peripheral equipment that permit the automatic controlled operation of the filter for extracting liquids from a fluid liquid/solid slurry and for the formation of a substantially dry filter cake. The efficiency of the filter apparatus is increased by the use of hot gas as a material for treating the cake within the filter for extracting the liquids as filtrate. The hot gas may be hot air, hot inert gas, steam, or combinations thereof in controlled sequences. The filter is adapted to be able to operate under vacuum or elevated pressure and at elevated temperatures.

19 Claims, 5 Drawing Sheets

U.S. PATENT DOCUMENTS

| | | | |
|---|---|---|---|
| 4,995,972 A * | 2/1991 | Kramer et al. | 210/179 |
| 5,059,318 A | 10/1991 | Benesi | |
| 5,209,841 A * | 5/1993 | Bratten | 210/107 |
| 5,292,434 A | 3/1994 | Benesi | |
| 5,382,356 A * | 1/1995 | Thogho et al. | 210/96.1 |
| 5,462,677 A | 10/1995 | Benesi | |
| 5,477,891 A | 12/1995 | Benesi | |
| 5,510,025 A | 4/1996 | Benesi | |
| 5,540,846 A * | 7/1996 | Koch et al. | 210/741 |
| 5,558,773 A * | 9/1996 | Aigeldinger et al. | 210/770 |
| 5,573,667 A | 11/1996 | Benesi | |
| 5,615,713 A | 4/1997 | Benesi | |
| 5,707,512 A * | 1/1998 | Koch et al. | 210/136 |
| 5,846,433 A * | 12/1998 | Sorensen et al. | 210/709 |
| 6,033,579 A * | 3/2000 | Riemer et al. | 210/772 |
| 6,099,725 A * | 8/2000 | Silverstein et al. | 210/227 |
| 6,103,191 A * | 8/2000 | Luker | 422/38 |
| 6,159,359 A | 12/2000 | Benesi | |
| 6,182,375 B1 * | 2/2001 | Banerjee | 34/398 |
| 6,409,929 B2 * | 6/2002 | Bott et al. | 210/770 |
| 6,491,817 B1 | 12/2002 | Benesi | |
| 7,439,004 B2 * | 10/2008 | Malachowski et al. | 430/137.1 |
| 7,674,386 B2 * | 3/2010 | Benesi | 210/741 |
| 2006/0027509 A1 * | 2/2006 | Benesi et al. | 210/770 |

FOREIGN PATENT DOCUMENTS

| | | |
|---|---|---|
| DE | 197 52 653 A 1 | 11/1997 |
| DE | 200 19-721 U 1 | 11/2000 |
| GB | 2 280 857 A | 11/1993 |

* cited by examiner

O = valve open
C = valve closed
X = valve open or closed depending on application

| | | | | | Valve settings | | | | |
|---|---|---|---|---|---|---|---|---|---|
| | | Slurry Fill | Slurry Recirc | Vent-Heater Drain Outlet | Blow-down Hot Gas | Steam | Belt Wash | Cake Wash | Seal Air (note 2) |
| | | 801 | 810 | 802 | 803 | 809 | 804 | 806 | 805 |
| Cycle step | Optional step? | B | I | C | E/F | A | W | D | P1/P2 |
| 1. Plates close | | | | | | | | | |
| • Preheat | yes | C | O | C | X | X | C | C | X |
| 2. Slurry fill | | O | C | C | C | C | C | C | X |
| • Choice: Main outlet / Restricted outlet (note 1) | | O | C | O | C | C | C | C | X |
| • Vent / Header drain | yes | C | O | O | C | C | C | C | X |
| • De-water/Cake forming | yes | C | O | O | C | X | C | C | X |
| • Vent / Header drain | yes | C | O | O | C | C | C | C | X |
| • Blowdown any combination of gas/steam or multiple blowdown combinations | yes | C | O | C | C | C | C | C | X |
| • Vent / Header drain | yes | C | O | O | C | C | C | C | X |
| 3. Cakewash | yes | C | C | C | C | C | C | O | X |
| • Dewater/cake consolidation | yes | C | O | C | X | X | C | X | X |
| • Vent / Header drain | yes | C | O | O | C | C | C | C | X |
| 4. Blowdown | | | | | | | | | |
| • Any combination or multiple | yes | C | O | C | X | X | C | C | X |
| • Vent / Header drain | yes | C | O | O | C | C | C | C | X |
| 5. Open plates | | C | O | O | C | C | C | C | C |
| 6. Cake discharge | | C | O | O | C | C | O | C | C |
| • Belt wash / Belt cleaning (note 3) | | C | O | O | C | C | C | C | C |

Notes
1. Have choice of Main Outlet or Restricted Outlet which is used to maintain pressure in chamber and/or restrict flow from outlet.
2. Using seal air/gas system is optional. Depending on application, can use application specific gasket or sealing mechanism.
3. Liquid belt washing or liquid-free belt cleaning or combinatin are available.

HOT-GAS PRESSURE-FILTER APPARATUS

CROSS-REFERENCE TO RELATED APPLICATIONS

This application claims the benefit of U.S. Provisional Application No. 60/350,605, filed Jan. 22, 2002.

STATEMENT REGARDING FEDERALLY-SPONSORED RESEARCH OR DEVELOPMENT

Not applicable

REFERENCE TO MICROFICHE APPENDIX

Not applicable

BACKGROUND OF THE INVENTION

This invention relates to a filter apparatus and method of its operation, particularly to a pressure filter and method for extracting liquids from wet slurry fluids and for producing a substantially-dry filter cake of the solid materials present in such slurry fluids.

In many industrial processes and other applications where a slurry of solids and liquids is produced, it becomes necessary to filter the slurry solids from the liquids so that these materials may be efficiently utilized or, alternatively, disposed in an environmentally-safe manner. To separate the solids from the liquids, a filter apparatus, such as a pressure filter, is often used. Known pressure filters generally include one or more pairs of filter plates capable of relative motion. The plate inlet is adapted for receiving the slurry while the filtered liquids, called the filtrate, are collected by means of the plate outlet which also provides the requisite support for a filter medium positioned between the filter plates. This arrangement permits a filtration chamber to be defined by the inlet plate and the filter medium when the plates are pressed together. In the usual production cycle of such a filter, slurry is introduced into the filtration chambers under pressure through one or more inlet port, whereby it distributes itself throughout the chamber. After the filtration chamber is filled with slurry, the filter executes a series of programmed operations, namely, washing and/or treating the contents of the chamber in a particular manner, as well as pressurizing the chamber to force the liquids from the slurry through the filter medium, leaving the slurry solids, consolidated in a substantially-dry filter cake, within the chamber. The chamber is then opened, allowing the dry filter cake to be removed therefrom.

In the filter apparatus of the type here discussed, the filter is operated in a batch mode; i.e. apparatus open, apparatus closed, slurry input, treatment of the slurry to develop a cake, apparatus opened, filter medium moved as cake is discharged and advanced to the next cycle position, and then repeating the above steps. Efficiency of a pressure filter can be measured in the dryness of the resulting filter cake or in the success in removing a desired liquid from the slurry as effluent. The overall efficiency is measured in the amount of equipment and peripheral utilities that may be needed to accomplish a filter cycle as well as the length of time required for a single filter operation.

A need therefor arises for pressure-filter apparatus capable of efficiently treating a variety of slurries in a quick and low cost method. Furthermore it is desireable to provide a pressure-filter apparatus that is energy-efficient and capable of producing a substantially-dry filter cake in a minimum amount of time.

SUMMARY OF THE INVENTION

A pressure filter is disclosed. The filter apparatus includes two continuously mating surfaces movable relative to each other and a filter medium capable of being disposed therebetween. A surface is provided for supporting the filter medium. This supporting surface is bounded by and is, substantially coplanar with one of the continuous mating surfaces. The filter further includes an inlet cavity, bounded by the other of the continuous mating surfaces, and an inlet distributor in communication with the inlet cavity. When the mating surfaces are pressed together, a filtration chamber is defined by the inlet cavity and the filter medium. The filter apparatus may include a plurality of filtration chambers, constructed as described above, a plurality of peripheral elements for introducing slurry, gasses and liquids to the filtration chamber, an exit port or ports for removing liquids and/or gasses from the chamber, the necessary valving systems, and control means for causing the sequential operation of the filter apparatus and its peripheral elements.

The advantages of the present invention will become apparent after consideration of the ensuing description and the accompanying drawings.

BRIEF DESCRIPTION OF THE DRAWINGS

The present invention is illustrated by way of example and not by way of limitation, in the figures of the accompanying drawings, where.

For purposes of illustration, these figures are not necessarily drawn to scale. In all of the figures, like components whereever possible are designated by like reference numerals.

DETAILED DESCRIPTION OF THE INVENTION

Throughout the following description, specific details are set forth in order to provide a more thorough understanding of the invention; however, the invention may be practiced without these particulars. In other instances, well known elements have not been shown or described to avoid unnecessarily obscuring the invention. Accordingly, the specification and drawings are to be regarded in an illustrative, rather than a restrictive, sense.

Figure 1:
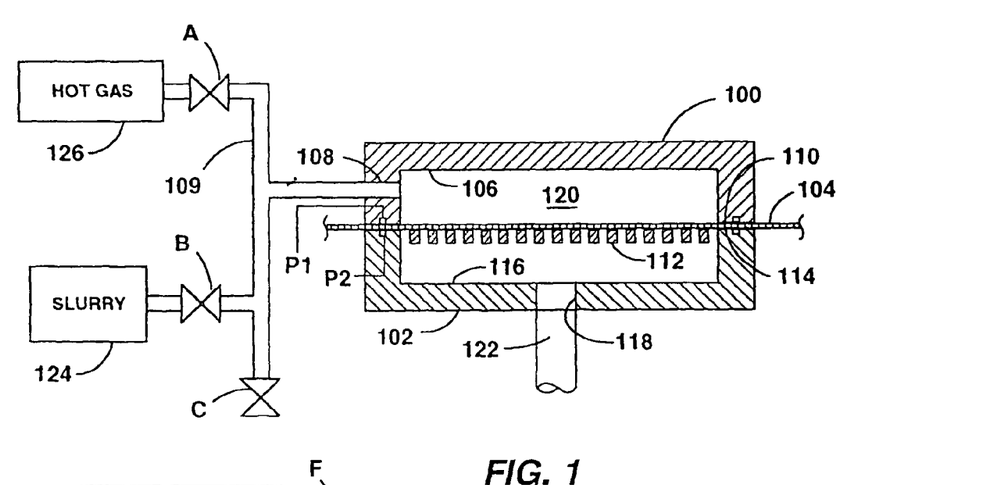
FIG. 1 is a schematic sectional view of a pressure-filter apparatus and peripheral elements in accordance with one embodiment of the present invention.

FIG. 1 is a schematic view of a pressure-filter apparatus according to one embodiment of the present invention. The apparatus includes an inlet plate 100 and an outlet plate 102, movable relative to each other, with a filter medium 104 capable of being disposed therebetween. Inlet plate 100 has an inlet cavity 106 as well as an inlet port(s) 108 in communication with cavity 106 and inlet piping (header) 109. Inlet port 108 may be horizontal, as shown in FIG. 1, or may be vertically disposed. Furthermore, separate inlet ports for gasses and liquids may be utilized. Inlet cavity 106 is bounded by a continuous mating surface 110. Outlet plate 102 incorporates a grid 112, which provides a supporting surface for filter medium 104. This supporting surface is bounded by and substantially coplanar with (e.g., within approximately 1/16 of an inch (1.0 mm)) a continuous mating surface 114. Plate 102 further includes an outlet cavity 116 for collecting the filtrate liquids and an exit port 118 for discharging the filtrate, which may then undergo further processing or be properly disposed. Exit port 118 leads into a filtrate line 122. As viewed from the top, the peripheral shape of plates 100 and 102 may take any form, but is usually rectangular or circular.

When plates 100 and 102 are pressed together, as illustrated in FIG. 1, a filtration chamber 120 is defined by inlet cavity 106 and filter medium 104. It should be understood that the longitudinal and transverse dimension of the filter medium inside chamber 120 exceed the corresponding dimensions of inlet cavity 106. The depth of the filtration chamber may vary from about 0.25 of an inch (one centimeter) to about 8 inches (20 centimeters), depending on the particular application. An inlet distributor may be disposed between inlet port 108 and cavity 106 to promote an optimal dispersion of slurry within the filtration chamber and to allow subsequent application of pressurized fluids without distrubing the uniform distribution of slurry inside the filtration chamber.

FIG. 1 provides only a schematic representation of the filter-plate configuration and certain elements of the apparatus either have not been shown or have-been shown in simplified form to avoid unnecessarily obscuring the invention, for example, continuous mating surfaces 110 and 114 may contain recessed grooves having fluid connections P1 and P2 for providing an effective seal between the mating surfaces of the filter plates to substantially reduce or completely eliminate leakage of slurry fluids between the filter plates. The specific details of such an arrangement is disclosed in U.S. Pat. No. 5,059,318, which is hereby incorporated by reference. Similarly, grid 112 represents only one possible structure for providing the requisite supporting surface for the filter medium 104. Other alternatives for supporting the filter medium, as well as specific arrangements and construction of the filter plates, the filter medium, and other components of the filter apparatus have been disclosed in U.S. Pat. Nos. 5,292,434, 5,462,677, 5,510,025, 5,573,667, 5,615,713, and 6,491,817, all of which are hereby incorporated by reference. Even though inlet cavity 106 has been schematically illustrated in FIG. 1 as having square corners and vertical side walls, in practice it may be beneficial to provide an inlet cavity incorporating tapered side walls and radiused corners (not shown) to prevent the filter cake from adhering to the inside of inlet plate 100.

Referring once again to FIG. 1, in one embodiment of the invention the pressure-filter apparatus includes a slurry source 124 coupled with inlet piping 109 via a shut-off valve B. A source 126 of hot gas is coupled with inlet piping 109 through a shut-off valve A. Header 109 includes a drain valve C.

Source 126 comprises a holding tank whose pressure is maintained by, e.g., at least one compressor, boiler, or gas generator. Source 124 comprises a slurry-holding tank having at least one pressure-supply apparatus, such as a conventional pump.

Depending on the specific application, different combinations of fluids and pressures in tanks are possible. For example, the slurry supplied from sources 124 may be maintained at a pressure up to about 300 psi. Similarly, source 126 may contain hot gasses pressurized up to about 500 psi. Source 126 may contain a variety of hot gasses, e.g., steam maintained at a temperature from about 200° F. to about 500° F. or air/inert gasses maintained at a temperature up to about 550° F.

FIG. 1 Operation Sequence, Open Loop

1. Plates are closed. Valves A, B, and C are closed.
2. Valve B is opened to fill the filtration chamber with slurry. Valve B is closed once the filtration chamber is filled and the cake is formed therein. The duration of opening for valve B can be determined based on elapsed time or by measuring back-pressure inside the filtration chamber with a pressure sensor (e.g., valve B is closed when the back pressure inside the filtration chamber approaches the slurry-input pressure). Alternatively, valve B may be shut off when a flow meter indicates that the flow rate of slurry has decreased to a predetermined value or that a predetermined quantity of slurry has entered the chamber. In yet another embodiment of the invention, valve B maybe shut off when a load cell determines that the contents of the filtration chamber have reached a specific weight. As an optional step, header-drain valve C may be opened to drain the slurry from the header; valve C is then closed.
3. Valve A is opened and hot pressurized gas (e.g., steam, air or inert gas such as nitrogen) is introduced into the filtration chamber to force the liquids from the slurry cake. The shut-off point of valve A may be determined, e.g., by a pressure sensor located inside the filtration chamber or in the inlet piping. Alternatively, the shut-off point of valve A may be based on elapsed time, weight loss, or rate of fluid out of the filtration chamber.
4. Header drain valve C is opened to vent any residual pressure in the filtration chamber above the cake. Next, the plates are opened so the cake can be removed from the filtration chamber by advancing the belt.

Figure 2:
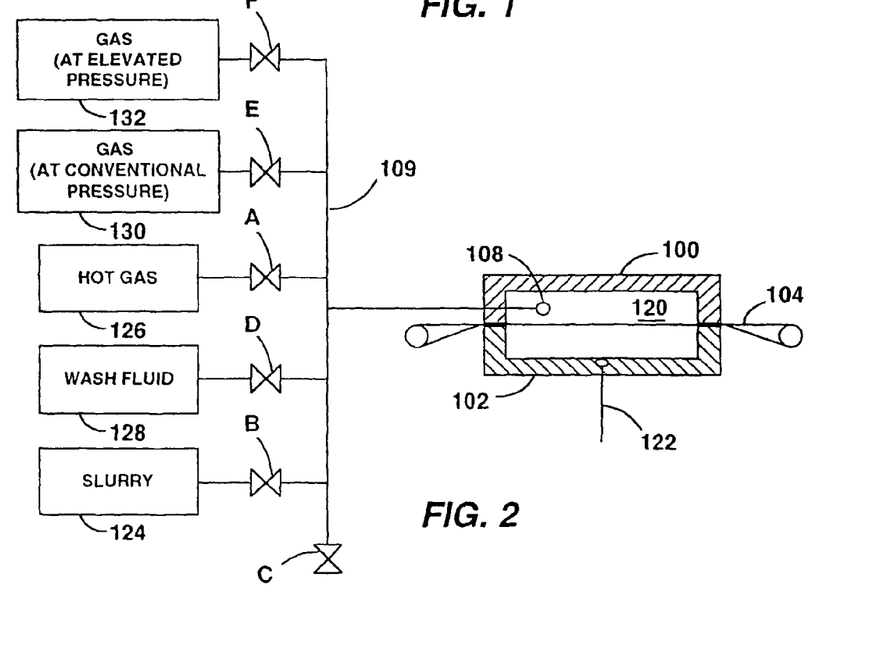
FIG. 2 is a schematic sectional view of another embodiment of the invention.

FIG. 2 illustrates another embodiment of the invention where the pressure-filter apparatus includes a slurry source 124, a source 126 containing hot gas, a source 128 containing wash fluid, a source 130 containing gas at conventional pressure, and a source 132 containing gas at elevated pressue. Sources 124, 126, 128, 130 and 132 are coupled with header 109 via shut-off valves B, A, D, E and F respectively.

Depending on the specific application, different combinations of fluids and pressures in the tanks comprising sources 124-132 are possible. For example, the slurry supplied from source 124 may be maintained at a slurry-input pressure up to about 300 psi. Similarly, source 126 may contain a hot gas at a pressure up to 500 psi. Source 126 may contain a variety of hot gasses, e.g., steam maintained at a temperature up to about 550° F. Wash fluid, which may be a liquid or a gas, in source 128 may be at an elevated temperature and may be maintained at a pressure up to about 300 psi. Sources 130 and 132 may be maintained at a temperature up to about 550° F. and may be maintained at pressures up to about 150 psi (conventional pressure) and up to about 500 psi (elevated pressure), respectively, and may contain gasses such as air or inert gas such as nitrogen. In this particular embodiment of the invention, for any given application, source 132 will be maintained at a higher pressure than that of source 130, i.e., elevated pressure is always higher than conventional pressure. In some cases, pressure in sources 128 will be higher than that in sources 124.

FIG. 2 Operation Sequence, Open Loop

1. Plates are closed. Valves A, B, C, D, E and F are closed.
2. Valve B is opened to fill the filtration chamber with slurry. Valve B is closed once the filtration chamber is filled and a cake is formed therein. The duration of opening of valve B can be determined in substantially the same manner as described above with respect to the apparatus of FIG. 1. As an optional step, header drain valve C may be opened to drain the slurry from the header; valve C is then closed.
3. Optionally, valve D is opened to introduce the cake-wash fluid into the filtration chamber. Once the washing operation is completed, valve D is closed. The duration of this step may be based, e.g., on elapsed time or on decreased weight of the contents of the chamber. Alternatively, valve D may be closed when a flow meter indicates that the flow rate of wash fluid has reached a predetermined value or that a predetermined quantity of wash fluid has entered the filtration chamber or the desired properties in the effluent have been reached. Header drain valve C may also be opened to drain the cake-wash fluid from the header, valve C is then closed.
4. Valve F is opened and gas at elevated pressure or elevated pressure and temperature is introduced into the filtration chamber to force the liquids from the slurry cake. The shut-off point of valve F may be determined, e.g., by a pressure sensor located inside the filtration chamber or in the inlet piping. Alternatively, the shut-off point of valve F may be based on elapsed time, decrease in weight of the contents of the filtration chamber, or flow rate of fluid out of the chamber.
5. When the residual pressure in the filtration chamber drops sufficiently to be substantially equal to conventional pressure, valve E is opened and gas at conventional pressure or conventional pressure with elevated temperature is introduced into the filtration chamber to force the residual liquids from the slurry cake. The shut-off point of valve E may be determined in substantially the same manner as that of valve F in the preceding step.
6. Valve A is opened and hot gas (e.g., steam, air or inert gas such as nitrogen) is introduced into the filtration chamber to force any residual liquids from the slurry cake and to dry the cake. The shut-off point of valve A may be determined, e.g., based on back-pressure inside the filtration chamber, elapsed time, or a combination of these parameters.
7. Header drain valve C is opened to vent any residual pressure in the filtration chamber above the cake. Next, the plates are opened so that the cake can be removed from the filtration chamber by advancing the belt.

Figure 3:
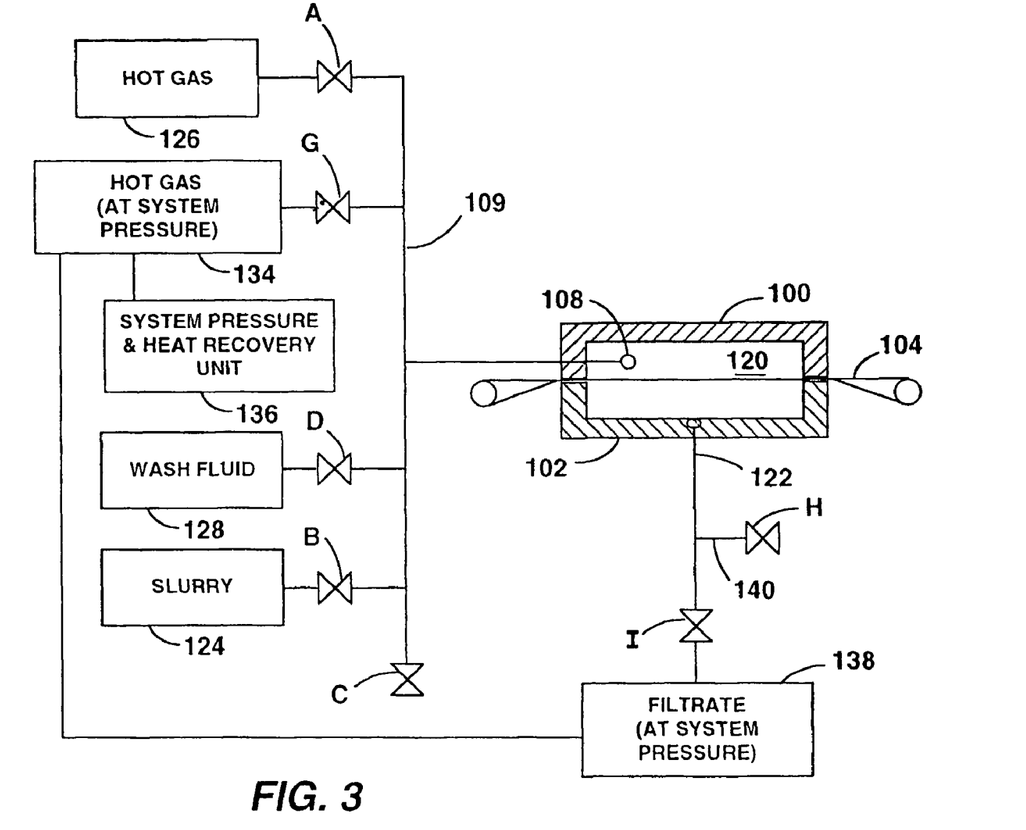
FIG. 3 is a schematic sectional view of yet another embodiment of the invention.

FIG. 3 illustrates yet another embodiment of the invention, where the pressure filter apparatus includes a slurry source 124, a source 126 containing hot gas, a source 128 containing wash fluid, and a source 134 also containing hot gas. Hot gas source 134 is coupled with a conventional automatic system pressure and heat recovery unit 136. Sources 124, 126, 128 and 134 are coupled with header 109 via shut-off valves B, A, D and G, respectively. Filtrate line 122 discharges into a filtrate tank 138 through a shut-off valve I. Filtrate line 122 further includes a filtrate vent 140, terminating in a shut-off valve H. Filtrate tank 138 is coupled with hot-gas source 134 and is at the same pressure therewith.

Depending on the specific application, different combinations of fluids and pressures in the tanks comprising sources 124, 128, 126 and 134 are possible. For example, the slurry supplied from source 124 may be maintained at a pressure up to about 300 psi. Source 126 may contain a hot gas at a pressure up to about 500 psi. Source 126 may contain a variety of hot gasses, e.g., steam maintained at a temperature of about 200° F. to about 550° F. or air/inert gasses maintained at a temperature up to about 550° F. Similarly, source 134 may contain a hot gas at a pressure up to about 150 psi (system pressure). Source 134 may contain a variety of hot gasses, e.g., steam maintained at a temperature from about 200° F. to about 360° F. or air/inert gasses maintained at a temperature up to about 550° F. Wash fluid in source 128 may be maintained at a pressure up to about 300 psi and/or at temperature 550° F. In this particular embodiment of the invention, for any given application, system pressure is lower than the pressures maintained in sources 124, 126 and 128. In some cases, pressure in source 128 will be higher than that in source 124.

FIG. 3, Operation Sequence, Closed Loop

1. Plates are closed. Valves A, B, C, D, G, H and I are closed.
2. System is pressurized by opening valve G. As an optional step, while valve G is open, valve H may be opened to preheat the filtration chamber and to purge preexisting air from the chamber. Valve H is then closed, followed by closing valve G. After valve H is closed, valve G should remain open long enough so that the pressure in the filtration chamber becomes equal to system pressure.
3. Valve I is opened.
4. Valve B is opened to fill the filtration chamber with slurry. Valve B is closed after the slurry fill is complete. The duration of opening of valve B can be determined in substantially the same manner as described above with respect to the apparatus of FIG. 1. As an optional step, header drain valve C may be opened to drain the slurry from the header; valve C is then closed.
5. Optionally, valve D is opened to introduce the cake-wash fluid into the filtration chamber. Once the washing operation is completed, valve D is closed. The duration of this step may be based, e.g., on elapsed time. Alternatively, valve D may be closed when a flow meter indicates that the flow rate of wash fluid is decreased to a predetermined value or that a predetermined quantity of wash fluid has entered the filtration chamber. Header drain valve C may also be opened to drain the cake-wash fluid from the header; valve C is then closed.
6. Valve A is opened and hot gas is introduced into the filtration chamber to force the liquids from the slurry cake. The shut-off point of valve A may be determined based on the back pressure inside the chamber, elapsed time, decrease in weight of the contents of the chamber, or a combination of these parameters. As an option, while valve A is open, flow of hot gas through valve I may be restricted to maximize the interaction dwell time between the hot gas and the filter cake.
7. Valve I is closed to prevent system pressure from entering lower plate 102.
8. Valve H is opened to vent pressure below the cake.
9. Valve C is opened to vent any residual pressure in the filtration chamber above the cake. Next, the plates are opened so the cake can be removed from the filtration chamber by advancing the belt.

Figure 4:
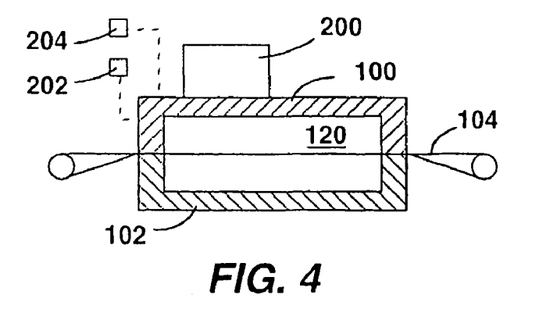
FIG. 4 is a schematic sectional view of a filter apparatus including a vibrator attached to an element that forms a part of the filter chamber.

In yet another embodiment of the invention, the pressure-filter apparatus includes a vibrator 200, attached to inlet plate 100, as shown in FIG. 4. The vibrator serves to help dislodge residual fragments of the cake continuing to adhere to the inlet plate after the dry cake has been removed from the filtration chamber at the end of the filtration cycle. In one embodiment of the invention, the vibrator may be pneumatically or electrically operated. Proximity switches 202 and 204 are positioned such that vertical motion of plate 100 causes the switches to be activated. The switches are coupled to a programmable logic controller 80 shown schematically in FIG. 8.

FIG. 4, Operation Sequence, Vibrator

1. As the plates begin to open (i.e., plate 100 is raised), the vibrator is turned on by the programmable logic controller.
2. The plates stop opening when the proximity switch 204 is activated by upward motion of plate 100.
3. Belt 104 is moved from the filtration chamber and discharges the cake.
4. Plates begin to close (i.e., plate 100 is lowered). As switch 202 is activated, the downward motion of plate 100 is arrested. The vibrator is then turned off and the drive of belt 104 is activated once more to discharge any remnants of the cake dislodged by the vibrator and is then stopped in the "home" position.
5. Plates close.

Those skilled in the art will appreciate that depending on the application, various modes of operation of the vibrator are possible, including continous operation without shutdown.

Figure 5:
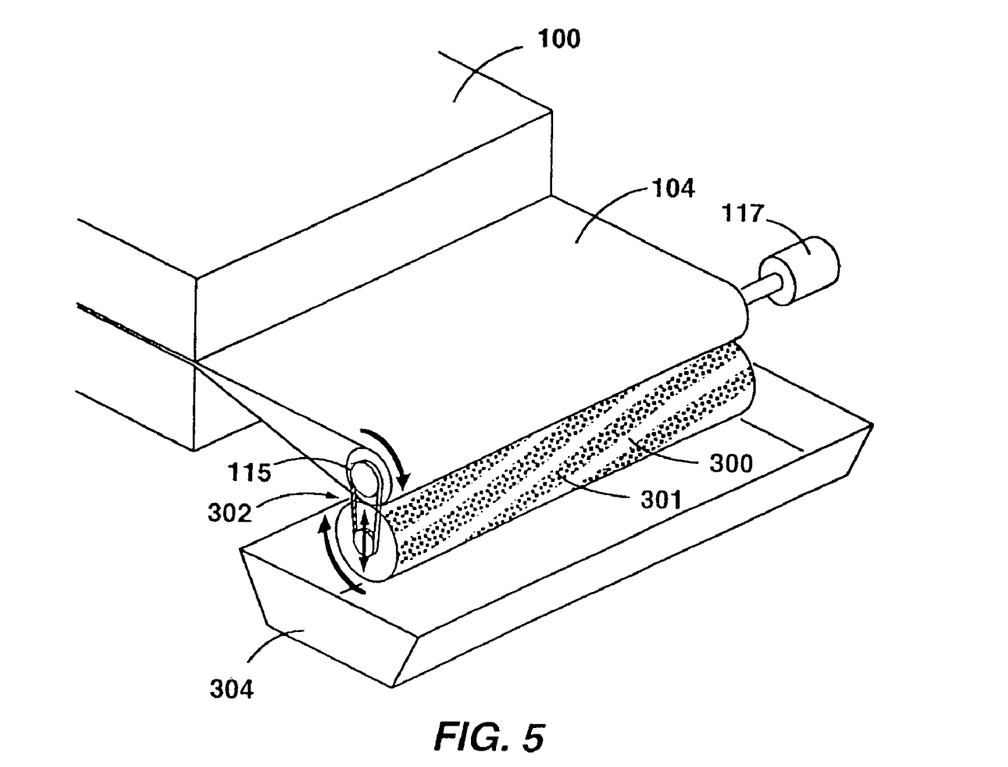
FIG. 5 is a perspective view of a means for cleaning the filter medium as used on one form of the invention.
Figure 6:
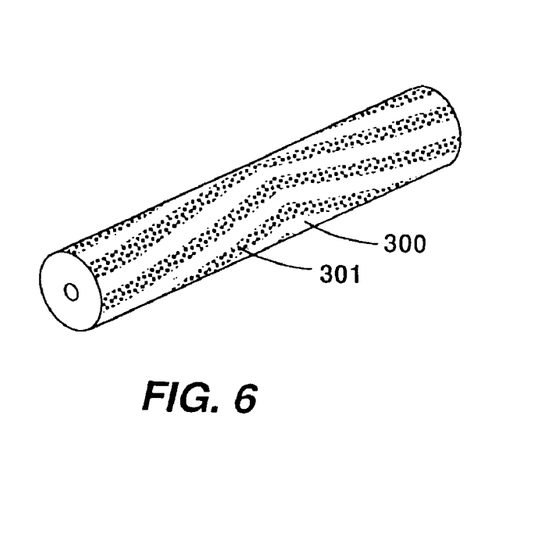
FIG. 6 is a prespective view of an alternative form of an element of the cleaning apparatus of FIG. 5

In yet another embodiment of the invention, depicted with reference to FIG. 5, the pressure-filter apparatus may include a brush 300 provided for cleaning belt 104. The brush has patterned bristles 301 and is coupled by a conventional drive mechanism 302, e.g., a chain drive, to a belt pulley 115, which may be driven by a motor 117. Two examples of a plurality of possible bristle patterns are illustrated in FIGS. 5 and 6. Bristle 301 may have variable stiffness, from coarse to soft. Drive mechanism 302 may incorporate a brush-adjustment mechanism. In one embodiment, the gearing of drive mechanism 302 and the diameters of the brush and the belt pulley may be selected such that the linear speed of the brush is four times that of the linear spead of the belt. Other ratios between belt speed and brush speed may be beneficial, depending on the application. Brush 300 may also be powered by a dedicated motor or may be geared to an idler pulley at the opposite end of the filter. Brushes at both ends of the filter may also be utilized. A collection bin 304 is used to gather the debris dislodged by the brush(s).

Figure 7:
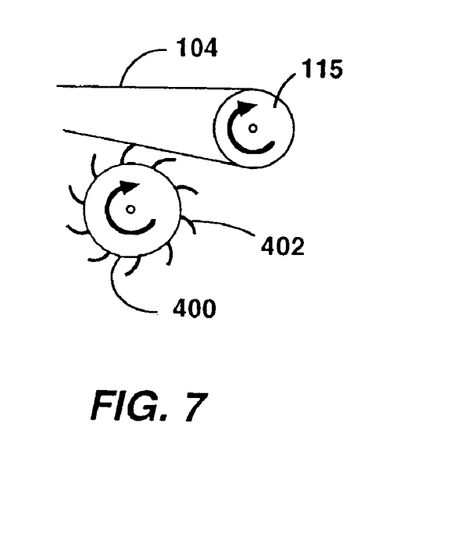
FIG. 7 is an alternative form of filter medium cleaning apparatus.

As shown in FIG. 7, in yet another embodiment of the invention, the pressure-filter apparatus may include a roller 400 with substantially-rigid vanes or cup wipers 402 for cleaning the belt. Roller 400 may be driven in a manner substantially similar to that of brush 300 described with reference to FIG. 5. Roller 400 may also be used in combination with brush 300.

Figures 8, 10:
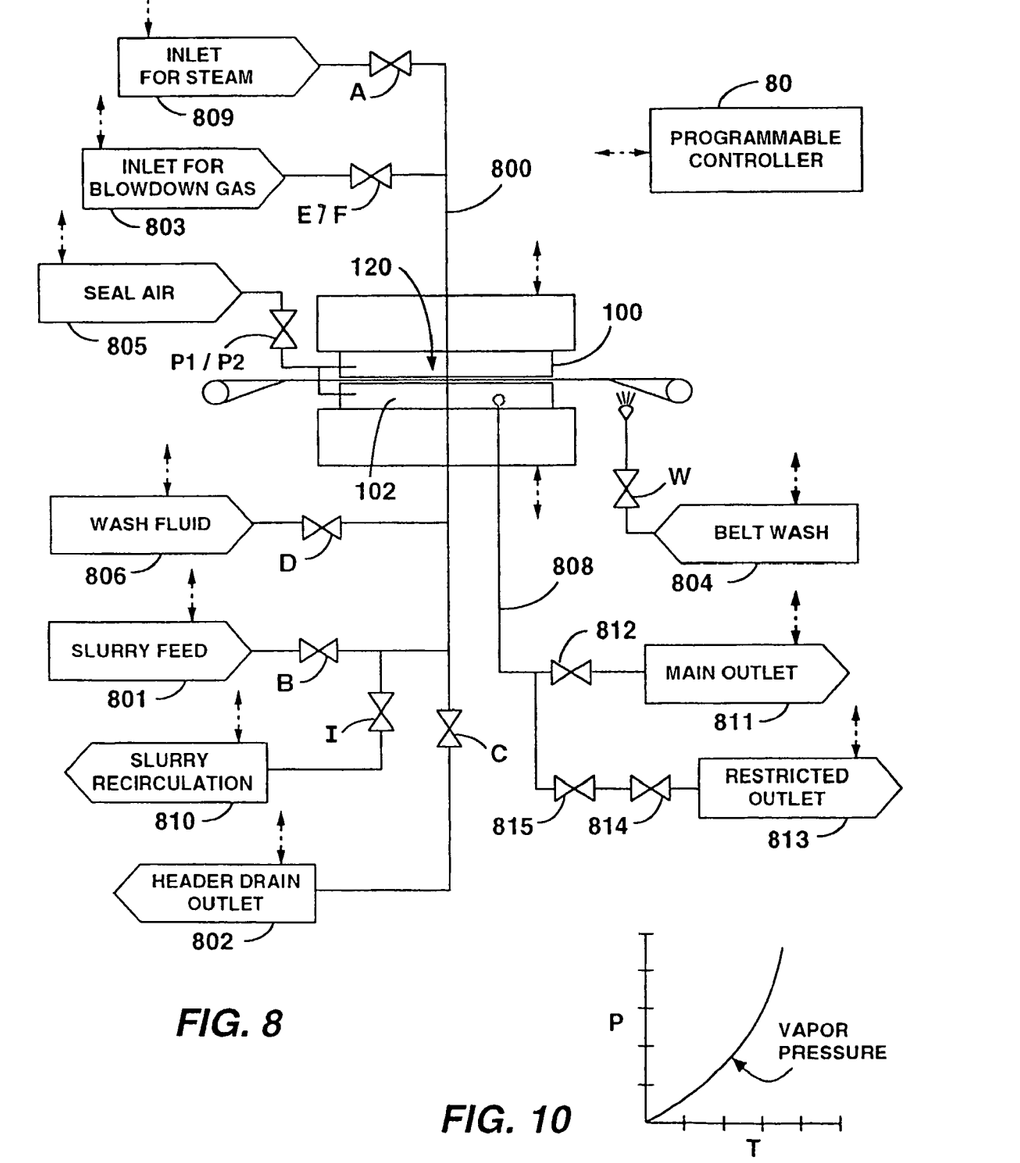
FIG. 8 is a schematic diagram of the valving elements and their control in accord with one form of the present invention.
FIG. 10 is a steam vapor phase graph of temperature verses pressure.

FIG. 8 is a schematic diagram of an embodiment with one possible set of valving elements and their control in operating a filter apparatus in accord with the present invention. A filter chamber 120 is produced by the inlet plate 100 and the outlet plate 102 with the filter medium 104 disposed therebetween. As illustrated there are sources of several fluids and gasses with output controlled by valves and a programmable controller 80 through input and output connection illustrated by dotted lines from the controller to the valves and reverse. The controller 80 also includes elements for programed control of the closing and opening of the inlet plate 100 and outlet plate 102. The controller may be supplied with the pressure, temperature and level sensors within the filter chamber for the purposes that have previously been described.

As illustrated, an inlet for slurry feed 801 is connected through valve B to an input header 800. The header 800 is represented by a single line; however, it should be understood that the single line represents the input of slurry and various gasses and a liquid into plate 100. A discharge header 808 is shown for effluent filtrate liquids and/or gasses from plate 102 for the filter apparatus as illustrated in FIG. 1.

Connected to the input header 800 at the discharge end is an outlet for header drain 102 through valve C for draining slurry feed after the chamber has been filled. Connected to the input header 800 at the input end is an inlet for blowdown gas 803 through valve E/F, an inlet for wash fluid 806 through valve D, an inlet for steam 809 through valve A. Each of the valves E/F, D and A being controlled by and having feedback to the controller 80.

A seal air source 805 is connected through a valve P1/P2 for the purpose described with respect to FIG. 1. An inlet for belt wash source 804 controlled through valve W is operated by the controller 80.

Dotted lines from the chamber 120 and from the belt drive system illustrate control from and feedback to the controller 80 for opening and closing the chamber and for operating the inlet of belt wash 804 (or the brush system of FIGS. 5-7) to clean the filter mediun 104 when the inlet plates 100 and 102 are separated in preparation for reentry into the apparatus when the next filter cycle is initiated.

Discharge header 808 is connected to a main outlet 811 through a suitable valve 812 and to a restricted outlet 813 through a valve 814 and an adjustable valve 815. The discharge header 808 caries effluent filtrate and any wash fluids or gasses that pass through the filter cake formed within the chamber 120. Those fluids may be used to pretreat imput fluids or may be connected to collection apparatus. When the chamber 120 is to be pressurized (before, during or after slurry input), the valve 815 is used to maintain a desired system pressure. All of these valves can be under control by the controller 80.

Because the filter apparatus operated in accord with the present invention can produce differing filtrates based on the input of air, hot air, hot gases, steam or wash fluids of different chemical composition, there can be different filtrates produced at different times during the operation. In some cases the filtrate can be the desired product and/or the filtrate can be recirculated to pretreat certain of the input materials to the apparatus. FIG. 8 also illustrates an outlet for slurry recirculation 810 operated by valve I under control of the controller 80. The recirculated filtrate is available for recirculation to pretreat, for example, the slurry input 801, the inlet blow down gas 803, the inlet of wash fluids 806 or the inlet for steam 809.

Figure 9:
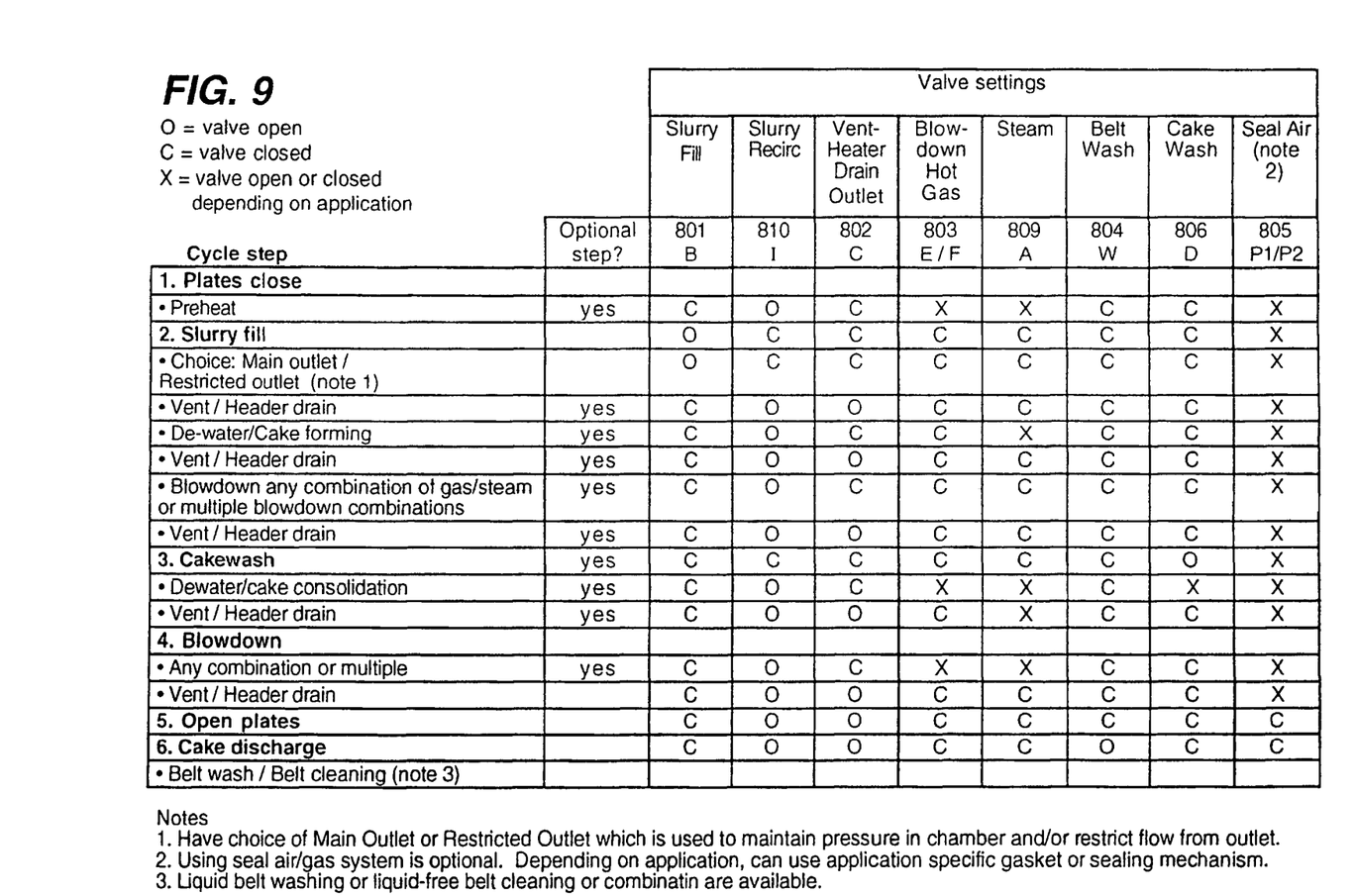
FIG. 9 is a chart showing possible operations and combination of operations of the chamber forming apparatus and the peripheral elements.

FIG. 9 is a representative example of possible sequence of operation of the valves of FIG. 8 under control by the controller 80. In the chart of FIG. 9 "C" represents a closed valve, "O" an open valve and an asterisk "*" by an "O*" or "C*" indicates optional operation of the respective valve during an operation of the apparatus. The chart represents a complete cycle of a filter apparatus in accord with the present invention from plate closing, slurry filling, cake wash, blowdown, open plates and cake discharge.

The operation of the filter apparatus in accord with the present invention permits the treatment of slurry to separate the slurry into slurry solids and slurry liquid. The present apparatus can be operated at pressure below atmospheric (vacuum) or at elevated pressure up to about 500 psi. The apparatus can operate with temperatures in the range of ambient to about 550° F. so as to treat slurries at varying temperature ranges. Under the control of a suitable controller, the apparatus can be programmed to treat slurries in a sequence of hot air, hot gasses, liquids and/or steam in repeated sequences. In some cases the chamber is filled with slurry, then dewatered, then filled again in one or more cycles. A particular advantage is available because the filter chamber can sustain elevated pressure and, under such pressures, steam passing through the filter cake formed in the chamber can remain dry while transferring useful heat to the filter cake.

FIG. 10 illustrates a well known vapor phase diagram of steam illustrating in the "x" axis temperature and in the "y" axis pressure. The plotted line represents the transition of vapor to dry steam at a temperature and pressure.

The use of dry steam is a particularly desireable feature for the treatment of those slurries where the resultant filter cake is improved when heated but cannot withstand wet treatment while heated. A variety of temperature and pressure treatments can be treated with the present apparatus.

The use of hot gas as a slurry treatment has been shown to improve the efficiency of the separation process and has permitted the production of a drier filter cake in discharge from the apparatus. Combinations of hot gas, inert gasses and steam have produced improved quality filter cake and/or filtrate and have been shown to reduce the amount of utilities needed to produce a dry filter cake.

As a side requirement in the treatment of slurries that produce a filter cake that cannot be subject to moist conditions, the present invention provides for the dry treatment in cleaning a filter medium. Residual liquid on a belt cleaned with wash fluids can cause adverse conditions within the filter chamber. With the dry filter belt cleaning system of FIGS. 5-7, the filter medium 104 is brushed by brush 300 having a pattern of bristles 103 that effectively removes residual filter cake solids from the medium 104. The brush cleaning can be effected at both ends of the apparatus; i.e., when the belt leaves the chamber and again before it reenters the chamber.

The belt illustrated in the FIGS. 5-7 and described above for cleaning is a filter medium that collects the solids of the slurry when the liquids are forced out as effluent. The filter medium may be specifically designed for the particular slurry being separated and particularly for the pressure and temperature ranges to be encountered within the filter chamber in a slurry separation process. Filter medium of various constructions are described in U.S. Pat. Nos. 5,462,677, 5,477,891 and 5,615,713 which are incorporated by reference.

Some of the features of the present apparatus and its operation permit the reduction in utilities needed for completing a filter operation. One such reduction is accomplished by using hot air in forcing fluids from the slurry within the chamber. The usual compressor that supplies high pressure air heats the air in the process of increasing its pressure. Frequently, such air compressors are equipped with an air cooler in a system that passes the compressed air to an accumulator. With the present apparatus, that cooler can be eliminated because the filter apparatus can accomodate the high pressure air and high pressure air at elevated temperature. If the slurry being filtered to produce a desired filter cake can accept the elevated temperature filter gas, the cost of operating a compressed gas cooler can be eliminated, thus reducing that utility cost.

Another utility cost saving can be available through the discharge of hot filter cake from the filter apparatus. Some filter systems discharge a filter cake that must be further dried by being passed into a dryer. With the present invention, a substantially dry filter cake can be created and discharged at an elevated temperature. Such a filter cake discharge can completely eliminate the need for additional drying and thus eliminate another utility expense.

Some filtration processes require a cooled filter cake while the creation of the cake can be produced in a more efficient manner if hot gas or steam is used in the filtration process. In such a case, the present apparatus and its programmable controller can be programmed to cool the filter cake with cool dry air or gas within the chamber prior to the discharge of the cake from the chamber.

The processes of the present invention can be applied to the filter apparatus illustrated or may be applied to an expression filter that uses a diaphragm or flexible plate component to squeeze the slurry and cake formed to remove slurry liquids and/or, if cake wash is used, to squeeze and remove cake wash fluid(s). By proper design of such filters and filtration method, the slurry and/or cake can be treated with hot gas, hot inert gas, or steam prior to the squeeze of the diaphragm or flexible plate component, as well as after the cake is formed and/or squeezed; or combination treated with hot gas, hot inert gas, or steam both prior to squeezing and after squeezing. In the case of dual-sided filtration or dual-sided filtration expression filters with filter medium on both sides of the cake forming area, the hot gas, hot inert gas, and/or steam can be applied through the filter medium into the cake, or between the filter medium where cake is formed.

Often, a more efficient filtration process is accomplished with the present filter apparatus. However, it should be noted that the methods of the present invention can be applied to other filters.

An understanding of the difference between wet steam and dry steam is helpful in appreciating the advantages of the present hot gas and steam drive for removing liquids from a slurry. The vapor phase of steam is determined by the temperature and the pressure of the steam. Considering a Pressure/Temperature graph as illustrated in FIG. 10 of the drawings it can be seen that if the temperature of the steam is maintained above a temperature to the right of the vapor phase curve, the steam will always be "dry" and not precipitate water onto a filter cake. In the same way, if the pressure of the steam is maintained above the left of the curve, the steam will be "dry" at that temperature. This condition is of particular advantage to the present apparatus because the chamber of the filter apparatus can be closed and the pressure within the chamber can be elevated to as high as 500 psi. Likewise, the chamber can be evacuated to create a vacuum within the chamber to reduce the temperature of the steam within the chamber when "dry" steam is desired. The chamber can be operated at −8.0 psi. A reference to standard steam tables well known in the art will show that the boiling point of water can be reduced in a vacuum or increased in a pressurized system. Steam for the present invention can be used in the temperature ranges of about 80° C. to about 230° C. If the slurry being filtered cannot withstand high temperature, a vacuum can be created within the chamber. If the slurry can withstand elevated temperature, the chamber can be pressurized and steam can be passed through the cake in the filtration process. In both cases, the pressure and temperature within the chamber can be controlled to keep the desired "dry" quality of the steam. Steam is a more efficient heat transfer material because it can be maintained "dry" by controlling the pressure of the steam.

With the present invention and the control of the passage of filtrate and filter cake, the heat created during the filtration process can be recovered by pretreating the slurry or hot gasses with the heated products of the filtration process. The hot or heated filtrate can be recirculated into contact with the slurry or used to preheat the chamber or filtration gasses.

The filter apparatus can be controlled by a programmable controller in many differing cycles; those cycles being determined by the desired quality of the filtrate or the filter cake. In some cycles, a wash fluid is first passed through the filter cake to extract certain materials or liquids from the slurry. Those materials or liquids can be withdrawn from the filter chamber to a selected discharge location. The later extraction of liquids from the cake can be a different effluent and may be sent to a different location. The controller controls the operation of several separate valves that introduce different materials to the filtration chamber. Those materials can be used to preheat the chamber, to introduce the slurry, to introduce wash fluids, to introduce hot gas, inert gas or steam, in any desired sequence or repeated sequence. The objective of the filtration process may be to produce a desired filter cake or a desired effluent and the apparatus can be operated to produce the desired end products.

While certain preferred embodiments of the invention have been specifically disclosed, it should be understood that the invention is not limited thereto as many variations will be readily apparent to those skilled in the art and the invention is to be given its broadest possible interpretation wthin the terms of the following claims.

We claim:

1. A method for operating a temperature controllable and pressurizable fixed volume pressure filter apparatus formed with an openable filtration chamber for separating a quantity of slurry (124) into slurry solids and slurry liquids to form a substantially dry slurry solids filter cake, said apparatus comprising:

at least one pressure sealable fixed volume filtration chamber (120) consisting of an upper inlet plate (100) having an inlet cavity (106), a lower outlet plate (102) having an outlet cavity (116), said inlet plate and outlet plate having continuous mating surfaces to form a sealable internal cavity, said inlet plate having entry port means (108) into said sealable internal cavity and said outlet plate having exit port means (118) for exit from said internal cavity, said lower outlet plate including a fixed porous support grid (112) adjacent to said mating surfaces, said filtration chamber of fixed volume being formed between the interior of said inlet cavity and the surface of said porous grid when said mating surfaces of said inlet plate and outlet plate are sealed against each other, means for opening and closing said filtration chamber by relatively moving said upper and lower plates, a movable porous filter medium (104), said medium being disposed within said filtration chamber between said continuous mating and sealing surfaces of said upper and lower plates and supported on said fixed porous support grid when said filtration chamber is closed and movable through said filtration chamber when said filtration chamber is open, means for moving said filter medium through said filtration chamber when said filtration chamber is open, a source of slurry, said source of Slurry (124) coupled with said at least one filtration chamber through said input port means when said plates are closed, at least one source of temperature controllable and pressurizable fluid (126,128,130,132) coupled with said at least one filtration chamber through said input port means when said plates are closed, separate valving means (A,B,D,E,F) for controlling entry of said slurry and said temperature controlled and pressurizable fluid into said at least one filtration chamber after each closing of said filtration chamber, means for controlling said separate valving means (80) to uniformly distribute aid slurry into said filtration chamber after each closing of said filtration chamber and for introducing said temperature controllable and pressurizable fluid into said filtration chamber at predetermined pressure and temperature when said filtration chamber is closed for separating slurry liquid from said slurry and passing said separated slurry liquid through said exit port means to form said slurry solids filter cake on said filter medium, and means for moving said filter medium through said filtration chamber after each closing of said filtration chamber and when said filtration chamber is open by separation of said plates for discharging said slurry solids filter cake (104) from said apparatus, the method including the steps of:

a) after each closing of said upper and lower plates to establish said at least one pressure sealable fixed volume sealed filtration chamber with said filter medium supported within said filtration chamber between said continuously mating surfaces, uniformly distributing said quantity of slurry (124, B, 108) in said at least one sealed filtration chamber (120) after said closing of said filtration chamber, pressurizing and temperature controlling said sealed filtration chamber to a predetermined pressure and temperature, b) after forming said sealed filtration chamber forcing a first portion of said slurry liquid from said distributed slurry through the said filter medium (104) and through said exit port means in said sealed filtration chamber with a first quantity of said predetermined temperature controllable and pressurizable fluid (D,E,F, 108) to produce an initially formed formation of a filter cake of slurry solids and any retained portions of said slurry liquids within said filtration chamber on said filter medium, and c) after forming said filtration chamber and while said sealable filtration chamber is closed and temperature and pressure controlled at least to said first predetermined temperature and pressure, introducing and passing dry steam or hot gas fluid (A, 108) through said filter medium (104) and said initially formed filter cake to heat and displace said retained portion of said slurry liquid from said filter cake and through said exit port means to form said substantially dry slurry solids filter cake on said filter medium, said introduced and passed dry steam or hot gas fluid being maintained at least as high in temperature and pressure as the temperature and pressure in said sealed filtration chamber so as to be maintained in it's dry state and to prevent any precipitation of liquids onto said filter cake while said filter cake is in said filtration chamber, d) after predetermined conditions have been attained, discontinuing said introduction and passing of dry steam or hot gas fluid, e) after discontinuing said introduction of dry steam or hot gas fluid, venting said filtration chamber, f) opening said filtration chamber by relatively moving said upper and lower plates, g) then moving said substantially dry slurry solids filter cake on said filter medium through said open filtration chamber, h) discharging from said open filtration chamber and from said filter medium (104) said substantially dry slurry solids filter cake from said filtration chamber formed during each closing of said filtration apparatus on said filter medium, and i) repeating said steps a) through f) for successive closing and opening of said upper and lower plates in repeated operation of said pressure filter apparatus and for forming said substantially dry filter cake on said filter medium.

2. The method of claim 1 wherein said dry steam or hot gas fluid is dry steam.

3. The method of claim 1 wherein said dry steam or hot gas fluid is hot air, hot inert gas or steam, or combinations thereof.

4. The method of claim 1 wherein said dry steam or hot gas fluid is hot gas or hot air, hot inert gas or steam, or combinations thereof, and is passed through said initially formed filter cake during each closing of said filter apparatus in a sequence of individual selection of hot air, hot inert gas or steam, or combinations thereof, in an order determined by an initial analysis of the slurry to be separated into slurry solids and slurry liquid.

5. The method of claim 4 wherein said sequence of passing hot air, hot inert gas or steam, or combinations thereof, through said filter cake is a repeated sequence of selected hot air, hot inert gas or steam, or combinations thereof.

6. The method of claim 1 wherein said slurry is initially pre-treated with heat from hot air, hot inert gas or steam, or combinations thereof during each closing of said filter apparatus, while being uniformly distributed in said filtration chamber.

7. The method of claim 1 wherein during each closing of said filter apparatus introducing said first portion of said introduced temperature controllable and pressurizable fluid includes using hot wash fluid.

8. The method of claim 1 wherein said filtration chamber is preheated prior to having said slurry uniformly distributed therein.

9. The method of claim 8 wherein said fixed volume filtration chamber when sealed is pressurized with hot gas, hot inert gas, steam, or combinations thereof, prior to having said slurry uniformly distributed therein.

10. The method of claim 1 with the additional step of passing air or gas through said filter cake after said dry steam or hot gas fluid to cool said filter cake prior to discharging said dry filter cake from said open filtration chamber.

11. The method of claim 1 wherein said displaced slurry liquid from said pressurized filtration chamber is recirculated into contact with said slurry or hot gas to transfer heat from said displaced slurry liquid to preheat said slurry or hot gas.

12. The method of claim 1 wherein said introduced hot gas fluid is hot air, hot gas or dry steam at elevated temperature and pressure when introduced into said filtration chamber and when exiting from said chamber.

13. The method of claim 12 wherein said dry steam or hot gas fluid is at a temperature of about 80° C. to about 230° C.

14. The method of claim 12 wherein said hot gas fluid is at a pressure about −55.16 kPA (−8.0 psi) to about 2,757.92 kPA (400 psi).

15. The method of claim 1 wherein said introduced and passed dry steam or hot gas fluid is selected by analysis of said slurry to be separated so as to prevent unwanted structural changes in said slurry solids in said filter cake formed in said pressurized filtration chamber.

16. The method of claim 1 wherein means are provided in or associated with said filtration chamber for sensing conditions of temperature, pressure and filter cake formed condition, or combinations thereof, for controlling the distribution of said slurry in said filtration chamber and for controlling the introduction of said dry steam or hot gas fluid to said filtration chamber during each closing of said filter apparatus.

17. The method of claim 16 including the steps of sensing the temperature and pressure within said pressurized filtration chamber, controlling said distribution of slurry into said filtration chamber and said introducing and passing of said dry steam or hot gas fluid is in accord with said sensed conditions within said pressurized filtration chamber.

18. The method of claim 1 including the step of sealing said filtration chamber during each closing of said filter apparatus prior to distribution of said slurry, and then elevating the pressure in said sealed filtration chamber to a predetermined pressure.

19. The method of claim 1 wherein said at least one filtration chamber has a plurality of entry ports and exit ports for selectively entering said slurry or said hot gas fluid into said filtration chamber and for exiting liquids and hot gas fluid from said filtration chamber.

* * * * *